(12) United States Patent
Kilibarda (10) Patent No.: US 9,032,609 B2
(45) Date of Patent: May 19, 2015

(54) DIRECT VEHICLE BODY LOCKING SENSOR APPARATUS AND METHOD

(71) Applicant: Comau, Inc., Southfield, MI (US)

(72) Inventor: Velibor Kilibarda, West Bloomfield, MI (US)

(73) Assignee: COMAU LLC, Southfield, MI (US)

( * ) Notice: Subject to any disclaimer, the term of this patent is extended or adjusted under 35 U.S.C. 154(b) by 261 days.

(21) Appl. No.: 13/633,461

(22) Filed: Oct. 2, 2012

(65) Prior Publication Data

US 2013/0082169 A1    Apr. 4, 2013

Related U.S. Application Data

(60) Provisional application No. 61/542,439, filed on Oct. 3, 2011.

(51) Int. Cl.
*G01D 5/30* (2006.01)
*B62D 65/02* (2006.01)
*B62D 65/18* (2006.01)

(52) U.S. Cl.
CPC ......... B62D 65/026 (2013.01); *Y10T 29/53974* (2015.01); *Y10T 29/49998* (2015.01);
(Continued)

(58) Field of Classification Search
CPC .... B62D 65/026; B62D 65/18; B62D 65/028; Y10T 29/49998; Y10T 29/49769; Y10T 29/49771; Y10T 29/53052; Y10T 29/53087; Y10T 29/52961; Y10T 29/53974
USPC ............ 29/559, 407.04, 407.05, 407.09, 712, 29/720, 281.1, 281.4, 281.6; 33/549, 573, 33/608; 269/24, 311; 248/127, 128, 129, 248/132, 157; 250/222, 1
See application file for complete search history.

(56) References Cited

U.S. PATENT DOCUMENTS

| | | | |
|---|---|---|---|
| 4,242,803 A | * | 1/1981 | Dory ............................... 33/288 |
| 4,667,866 A | | 5/1987 | Tobita et al. |

(Continued)

FOREIGN PATENT DOCUMENTS

| | | |
|---|---|---|
| DE | 20012052 U1 | 10/2000 |
| EP | 0 232 999 A2 | 8/1987 |

(Continued)

OTHER PUBLICATIONS

Notification of Transmittal, International Search Report and Written Opinion of the International Searching Authority dated Aug. 25, 2011 from the corresponding International Application No. PCT/US2010/060531 filed Dec. 15, 2010.

(Continued)

*Primary Examiner* — John C Hong
(74) *Attorney, Agent, or Firm* — Young Basile Hanlon & MacFarland P.C.

(57) ABSTRACT

Disclosed herein is a sensing device for use in providing positive feedback of the position of a vehicle body securing device used to selectively secure a vehicle body to a vehicle body support movable along a path of travel. A vehicle body securing device is selectively movable between a locked position and an unlocked position. An indicator is connected to the securing device and is reciprocally movable to and from a target area when the securing device is in one of the locked position and the unlocked position. A sensor has a field of view selectively alignable with the target area. The sensor is operable to detect when the indicator is positioned at the target area to provide a positive indication of the position of the securing device.

20 Claims, 7 Drawing Sheets

(52) U.S. Cl.
CPC ...... *Y10T29/53052* (2015.01); *Y10T 29/49767* (2015.01); *Y10T 29/53087* (2015.01); *Y10T 29/53961* (2015.01); *Y10T 29/49771* (2015.01); *B62D 65/028* (2013.01); *B62D 65/18* (2013.01)

(56) References Cited

U.S. PATENT DOCUMENTS

| | | | |
|---|---|---|---|
| 4,774,757 | A | 10/1988 | Sakamoto et al. |
| 4,924,996 | A | 5/1990 | Svensson et al. |
| 4,937,929 | A | 7/1990 | Nokajima et al. |
| 5,347,700 | A | 9/1994 | Tominaga et al. |
| 6,008,471 | A | 12/1999 | Alborante |
| 6,173,881 | B1 | 1/2001 | Sloan et al. |
| 7,271,367 | B2 | 9/2007 | Kilibarda et al. |
| 8,800,981 | B2 * | 8/2014 | Jeong ............................ 269/25 |
| 2002/0135116 | A1 | 9/2002 | Dugas et al. |
| 2008/0104815 | A1 | 5/2008 | Kussmaul |
| 2009/0289043 | A1 | 11/2009 | Kilibarda |
| 2011/0138601 | A1 | 6/2011 | Kilibarda |
| 2012/0030924 | A1 | 2/2012 | Kilibarda et al. |

FOREIGN PATENT DOCUMENTS

| | | |
|---|---|---|
| EP | 1937120 A1 | 9/2007 |
| GB | 2 271 651 A | 4/1994 |
| JP | 05277848 A | 10/1993 |
| JP | 2003145363 A | 5/2003 |
| KR | 10-2004-0082843 A | 9/2004 |
| KR | 10-2009-0104442 A | 10/2009 |
| RU | 2219034 C1 | 12/2003 |

OTHER PUBLICATIONS

Communication with extended European Search Report, modified Abstract and the European Search Opinion dated Sep. 4, 2009 from the corresponding European Patent Application No. 09159965.4-2302.

* cited by examiner

DIRECT VEHICLE BODY LOCKING SENSOR APPARATUS AND METHOD

CROSS REFERENCE TO RELATED APPLICATION

The present application claims priority benefit to U.S. provisional patent application Ser. No. 61/542,439 filed Oct. 3, 2011, the entire contents of which are incorporated herein by reference.

TECHNICAL FIELD

The inventive devices and methods are in the general field of manufacture and assembly.

BACKGROUND

Increasing emphasis is placed on the accuracy and precision in manufacturing and assembly processes, particularly in the field of passenger vehicles. Demand for higher volumes of vehicles and efficient manufacturing and assembly of such vehicles has also increased, further straining the objectives of accuracy, precision and quality of the end product.

In the assembly of passenger vehicles, the building block is the skeletal body, still often made of formed sheet steel components and subassemblies. Modern assembly plants require hundreds of sequential build stations positioned along a progressive assembly line. As the vehicle body is built, it is essential that the vehicle body be accurately and precisely positioned at each individual assembly station so the automation, robots or human operators can accurately and precisely position and mount the components or subassemblies at each station.

Transporting and positioning the vehicle body has been accomplished in many ways. A preferred way is by a moving pallet that has pillars or risers, typically four or six to a pallet, which the skeletal body is positioned and sits atop of as it moves from station to station on the pallet. In order to achieve a predictable and accurate placement of the vehicle body at any one sequential build station, the skeletal vehicle body must first be fixedly positioned to the pallet and then second, the pallet and secured vehicle body must be positioned in the predetermined three-dimensional location at a particular build station so that the assembly operations at that station can be carried out. To the extent that a vehicle body must be loaded onto and removed from the pallet at various points along an assembly line, for example, transfer to another pallet or device for further processing along another assembly line, it is advantageous for the vehicle body to be loaded and locked to the pallet, or unlocked or unsecured from the pallet and removed from the pallet.

Various systems and operations for securing a vehicle body to a pallet and locating a pallet at sequential build stations have been proposed. One example is the Single Geometry Palletized Framing System described and illustrated in U.S. Patent Application Publication No. 2009/0289043 assigned to Comau, Inc., assignee of the present invention, the entire contents of which are incorporated herein by reference. Additional systems and operations for remotely securing a vehicle body to pallet are described and illustrated in U.S. Patent Application Publication No. 2011/0138601 assigned to Comau, Inc., assignee of the present invention, the entire contents of which are incorporated herein by reference.

A disadvantage in prior systems has involved complex hydraulic, pneumatic and other mechanisms secured aboard the moving pallet which fixedly secure and unsecure, as desired, the vehicle body to the pallet along the path of assembly. These systems require additional components to be added to the pallet and moved along with the pallet throughout the assembly process.

Another disadvantage is the possibility that the system used to secure the body to the risers, for example a hook, has not engaged the body as designed. For example, it is possible that due to misalignment between the body and the pallet, build variances, or malfunction of the system, that one or more of the hooks has not engaged the body or has not done so as designed. Prior systems would require a visual inspection which requires additional personnel or expensive vision equipment to view a difficult area to inspect underneath the vehicle body as the pallets continuously move down an assembly line. Although some conventional systems indicate a position of an actuation mechanism for the hook, they do not provide a positive indication of whether or not the hook is actually engaged with the body.

It would be advantageous to improve upon prior systems which secure a vehicle body to a pallet or structure that is moved along an assembly line and to accurately position the pallet and secured body at vehicle build stations. It would be advantageous to have a remote system for selective securing or locking the vehicle body to the pallet which does not require pneumatic or hydraulic mechanisms to actuate components on the pallet to secure the body. It would be further advantageous to have a system to secure the vehicle to the body that provides a positive indication that each of the hooks is either open (in a non-engaged position to allow installation or removal of the body on the risers) or closed (in an engaged position with the body). It would further be advantageous to design alternate methods for locating and securing the pallet at vehicle stations to better accommodate particular vehicle builds and body styles.

SUMMARY

The present invention includes devices and methods which provide a positive, visual indication of the position of the vehicle body securing device, for example a hook, used to engage and lock the vehicle body to a riser positioned on a movable pallet.

In one example, a portion of the pallet riser positioned below the vehicle body includes a reflective indicator positioned inside the riser and connected to the device which articulates along with the body hook between an open position (hook not engaged with the body) and a closed position (hook engaged with the body). An optical sensor stationarily positioned at the station where the hook is actuated is used to project an optical beam at a target position on the aligned riser toward the reflective indicator. If the beam is reflected back toward the optical sensor, a positive signal is received by the sensor that the hook is in a particular position, either open or closed depending on the desired indicator, providing a positive indicator that the hook is in the desired position.

In an alternate and preferred example, two sensors are used with two separate target areas on the riser. The first sensor is aimed toward an open hook indicator target area, where the indicator is positioned when the hook is in the open position, and a second sensor is aimed toward a closed hook indicator target area, where the indicator is positioned when the hook in in the closed position. This provides a secondary or redundant system check. For example, the first sensor would confirm that the hook is not in the open/unengaged position and the second sensor would confirm that the hook is indeed in the closed/engaged position locking the vehicle body to the pallet. The benefits of the dual sensor system equally apply when it is desired to remove the vehicle body from the pallet. The second sensor would confirm that the hook is not in the closed/engaged position and the first sensor would confirm that the hook is indeed in the open/unengaged position providing dual positive indicators that the body is free to be removed from the pallet.

The one or more sensors would be electronically connected to a controller which would receive and interpret the sensor signals and allow the build process to proceed or halt the process if, for example, a signal is received that a hook is still in an engaged position when the vehicle body is at a point in the build process when it is scheduled to be removed from the pallet.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

FIGS. 1-10 illustrate examples of the inventive device and methods for direct sensing of the position of a vehicular body locking device 10 described below. The direct sensing device 10 is shown in an exemplary use with a vehicle transport device 14 for securing and transporting a vehicle body 20 (schematically shown in FIG. 4) which is described and illustrated in further detail in U.S. Patent Application Publication No. 2011/0138601 assigned to Comau, Inc., assignee of the present invention. The device is also useful with the vehicle body locking device having a compliant hook as described and illustrated in U.S. Patent Application Publication No. 2012/0030924 assigned to Comau, Inc., assignee of the present invention. The entire contents of both applications are incorporated herein by reference.

Figure 1:
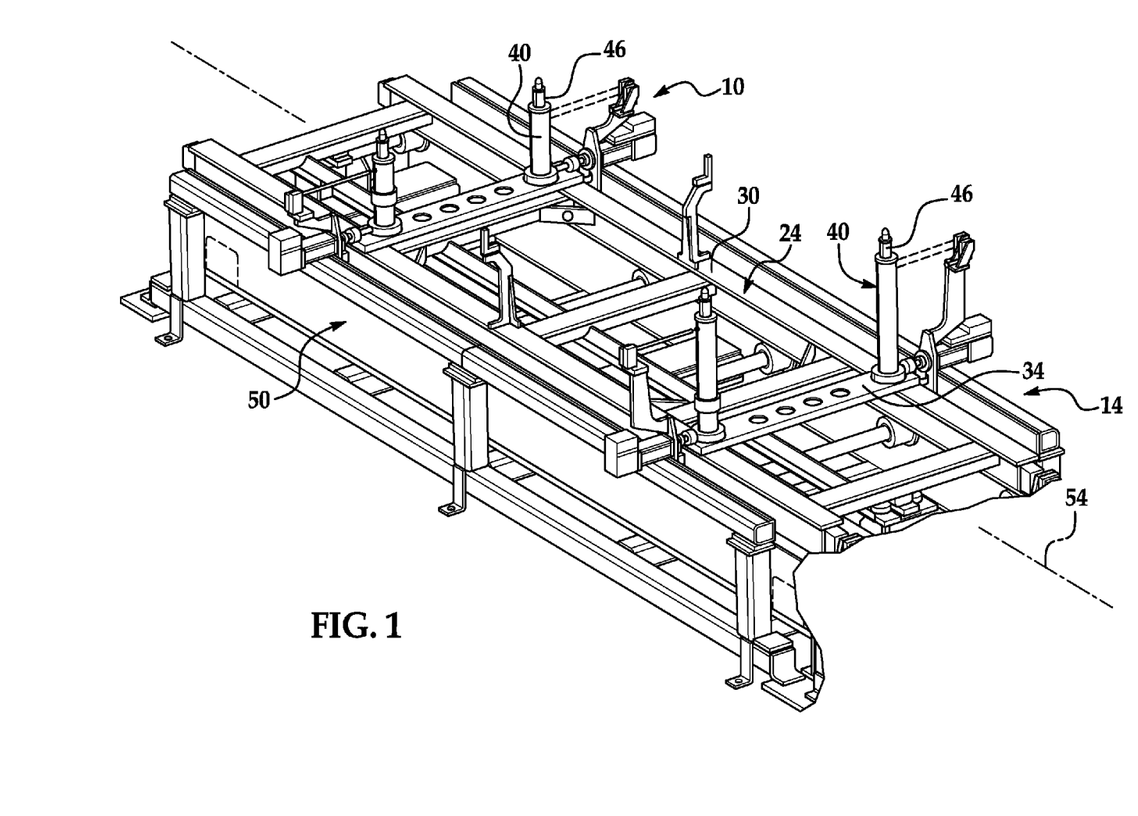
FIG. 1 is a schematic perspective view of an example of the inventive direct vehicle body locking sensor apparatus in exemplary use with an example of vehicle body transport device (vehicular body not shown)
Figure 2:
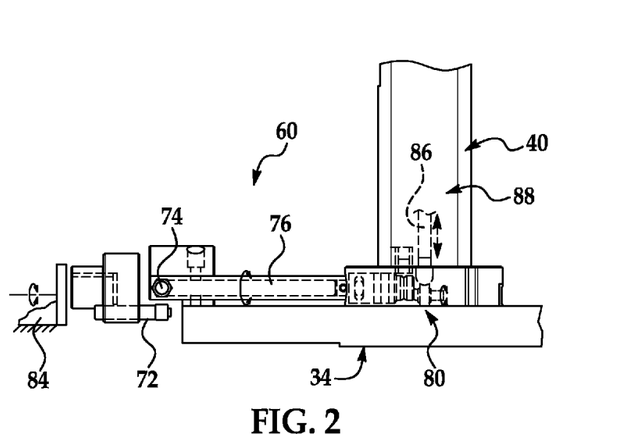
FIG. 2 is a schematic side view of an example of a remote vehicle body locking device useful with the direct sensing device shown in FIG. 1.
Figure 3:
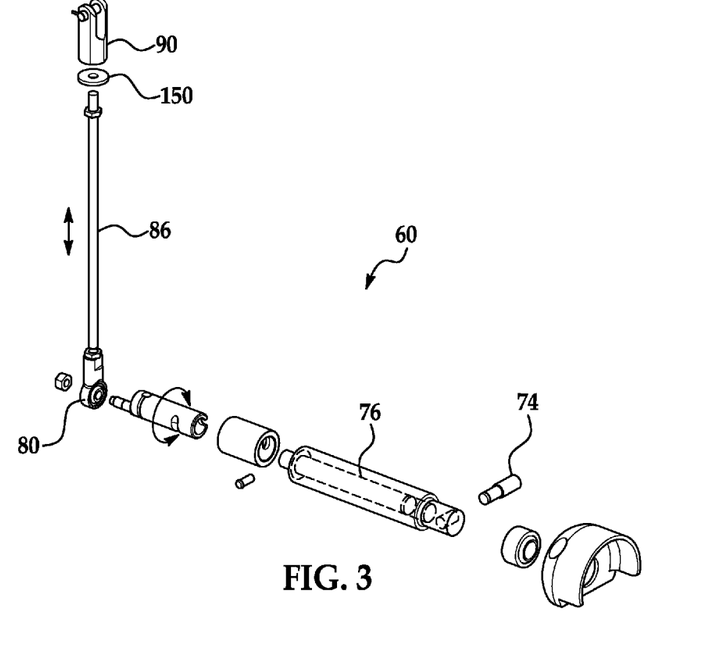
FIG. 3 is schematic perspective view of the body locking device shown in FIG. 2.

Referring to FIGS. 1-3, the direct sensing device 10 is summarily described with the exemplary vehicle transport device 14 used to secure and transport a vehicle body 20 along a path of travel 54, for example an assembly line in a vehicle production factory. In one example, sensor device 10 is partially configured and installed in the vehicle transport device 14 having longitudinal rails 30 having one or more cross-members 34 laterally spanning the rails. The exemplary transport pallet 24 includes a plurality of pillars or risers 40 (four shown in FIG. 1) which are rigidly connected to the cross-members 34 and extend vertically upward. The each pillar 40 includes a locating pin 46 positioned atop the pillar for positional engagement with a portion of a vehicle body, for example an aperture in the structural rails of a vehicle underbody.

The exemplary vehicle transport device 14 and pallet 24 may be used with a powered roller conveyor 50 which selectively moves the pallet 24 and vehicle body 20 along a predetermined path of travel 54.

Referring to FIGS. 2-4, 9a and 9b, a summary of a body locking assembly 60 is illustrated and described. Further details of the components and operations can be found in U.S. Patent Application Publication No. 2011/0138601. In the example, a vehicle body securing device or locking assembly 60 includes an actuator 64 stationarily mounted to a support 68 (shown in FIG. 5) positioned adjacent to the path of travel 54 at a build station along an assembly line. The actuator 64 includes a crank arm 72 which selectively engages and rotates a locking arm 74 mounted on the movable pallet 24. Locking arm 74 rotates an axle 76 which is connected to a rod 86 through a joint 80 positioned inside a cavity 88 in pillar 40. Rod 86 extends upward through the pillar 40 and is connected to a clevis 90 which is attached to a body component 94 having a vehicle body hook portion 100 housed inside the locating pin 46 as generally shown.

Figure 4:
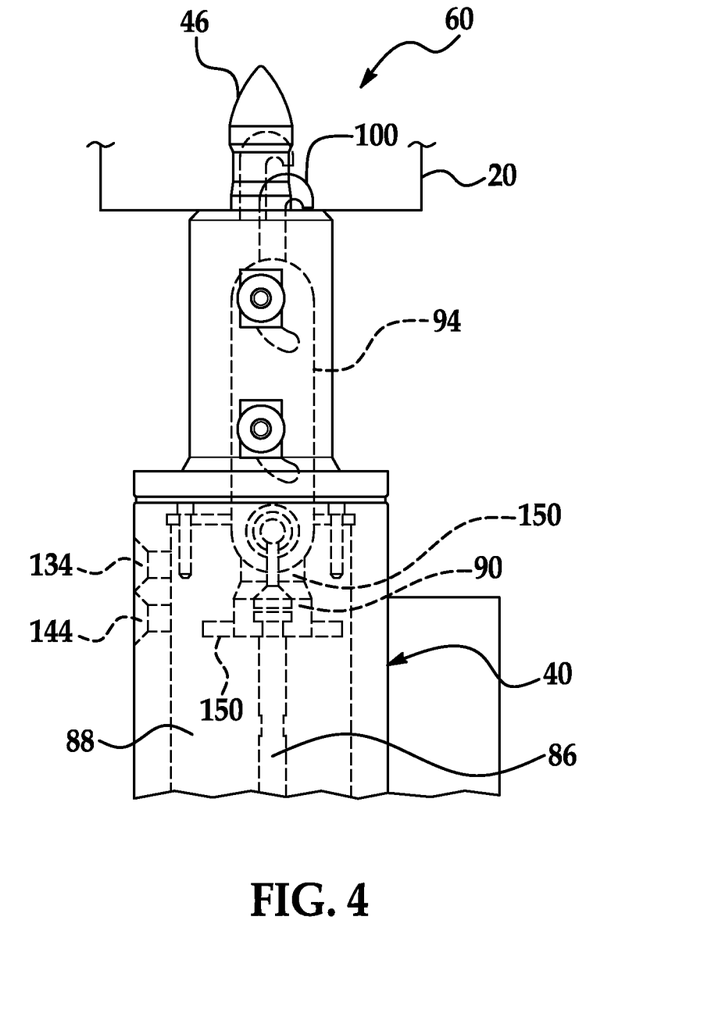
FIG. 4 is an enlarged partial side view of a pallet pillar including the sensor device of FIG. 1.

When a vehicle is installed onto the respective locating pins 46, and it is desired to secure or lock the vehicle body 20 in position to the pallet 24, the locking assembly 60 is actuated to move the hook 100 to engage or disengage the vehicle body 20. In the example as best seen in FIG. 4, hook 100 includes two positions defining a path of travel having first and second positions. In a first or open position (shown in phantom), the hook 100 travels along a first portion of the path of travel to a raised position inside the hollow locating pin 46. In this first or open position, the hook 100 is completely or substantially positioned inside locating pin 46 with no portion of the hook extending outside or beyond a perimeter of locating pin 46. A second, closed or locked position is also illustrated (solid line). In this closed or locked position, the hook 100 moves along the second portion of the path of travel and is pulled and forced in a downward direction from the first or open position. Through articulation of the hook through the second portion of the path of travel, the hook moves downward thereby exposing a portion of the hook outside of the perimeter of locator pin 46 to engage a portion of the adjacent vehicle body 20 to force and lock the vehicle body 20 to the locating pin 46, pillar 40 and pallet 24.

Figure 5:
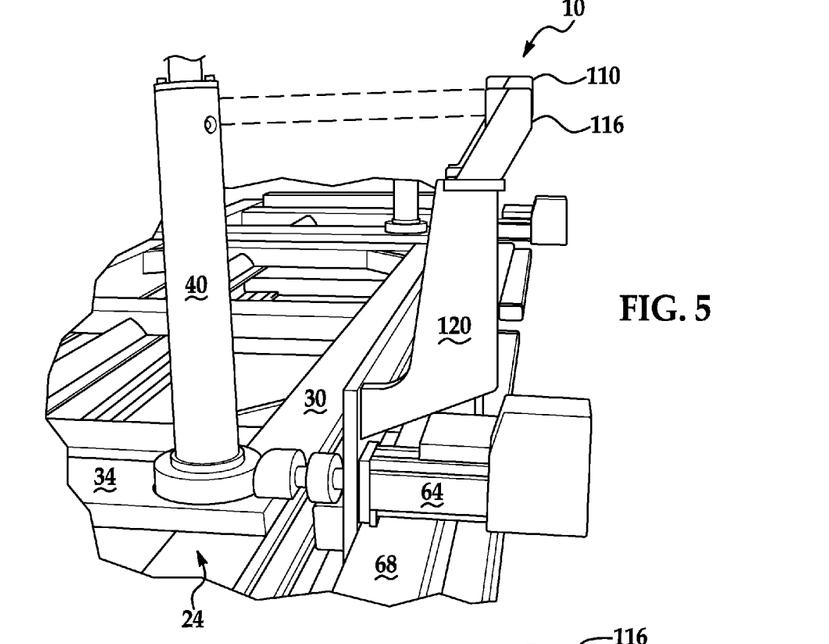
FIG. 5 is a left end view of a portion of the devices shown in FIG. 1.
Figure 6:
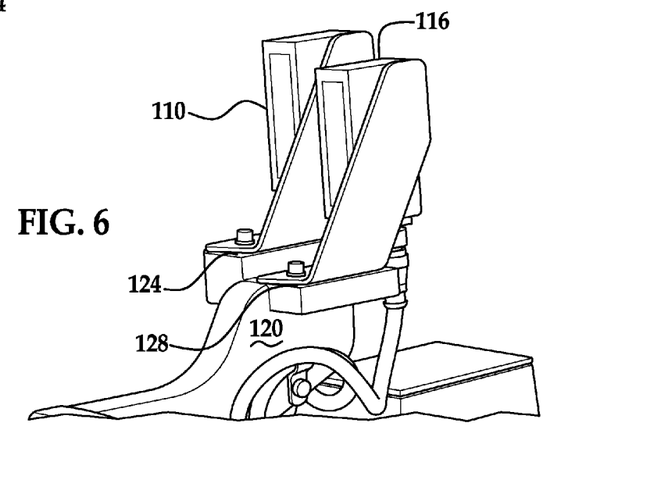
FIG. 6 is an enlarged partial perspective view of a portion of the device shown in FIG. 5.
Figure 7:
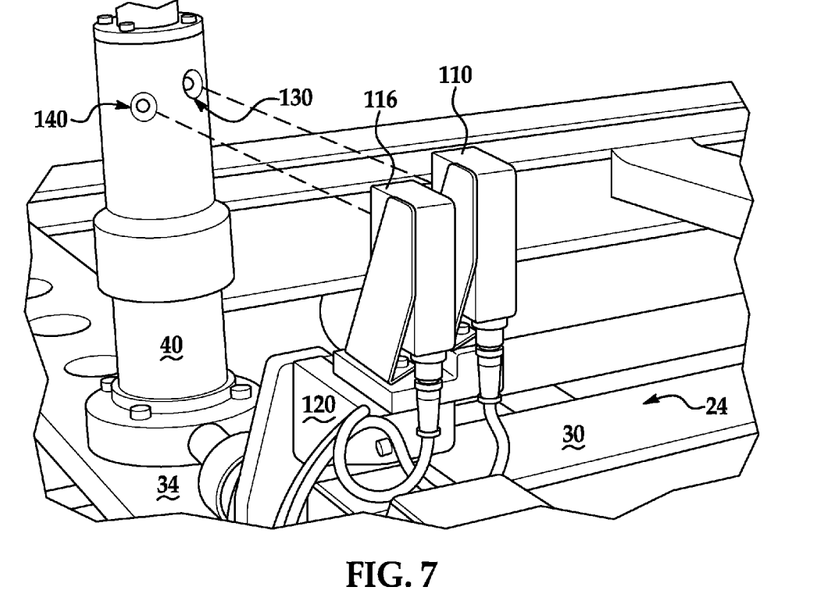
FIG. 7 is an alternate perspective view of the device shown in FIG. 6.

Referring to FIGS. 1 and 5-9, an example of the inventive direct vehicle body locking sensing device 10 is illustrated. In a preferred example, direct sensing device 10 includes a first sensor 110 and a second sensor 116 respectively mounted to a bracket 120 mounted to stationary support 68 as best seen in FIGS. 5-7. Sensors 110 and 116 are electronically connected a controller (not shown) to send and receive signals as well as selectively monitor and actuate the respective components.

Sensors 110 and 116 are preferably optical sensors which each project a light beam toward respective targets inside a pillar 40 as further described below. A suitable sensor is manufactured under the brand name Pepperl and Fuchs, model Visolux, Part No. 180708. It is understood that sensors or projectors such as lasers, ultrasonic, contrast, optical vision systems and other devices and processes known by those skilled in the art may be used. It is further understood that one sensor may be used with a single target area where the position of the securing device can be positively determined to be at one of the locked or unlocked positions.

As illustrated, first 110 and second 116 sensors are mounted at a respective first 124 and second 128 height on bracket 120 so as to distinguish between identifications by the targets as described below.

Figure 8:
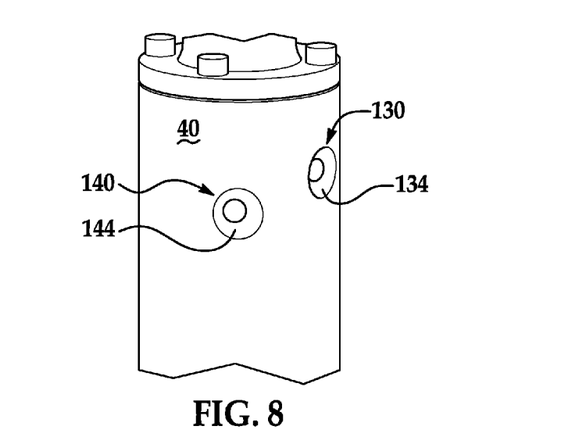
FIG. 8 is an enlarged, partial perspective view of the device shown in FIG. 7.

Referring to FIGS. 1 and 4-8 further details of an example of the sensor device 10 are illustrated. In a preferred example, each pillar 40 having a locking assembly 60 and hook 100 intended to engage and lock a vehicle body 20 includes a first target window 130 and a second target window 140 as best seen in FIG. 8. In the example, the first 130 and second 140 target windows are in the form of beveled through apertures 134 and 144 respectively which extend through an outer periphery of the pillar 40 to the pillar cavity 88 as best seen in FIG. 4. In the example, the centerpoint of first target aperture 134 is positioned and substantially in the same horizontal plane and aligned with the operative portion of first sensor 110. The centerpoint of second target aperture 144 is similarly aligned with the second sensor 116. In the example shown, the first sensor 110 and first target aperture 134 are positioned vertically higher than the second sensor 116 and second target aperture 144. It is understood that different configurations and orientations of the sensors and targets known by those skilled in the art may be used. It has been found beneficial for the target apertures 134 and 144 to have a beveled configuration so that debris and other contaminants typical in an assembly facility fall by gravity away from pillar cavity and the locking assembly 60 positioned therein. In the example illustrated, the difference in heights of 110 and 116 equals the difference of heights between the apertures 130 and 140. Other forms of apertures as well as targets and their configurations and orientations known by those skilled in the art may be used.

Figure 9A:
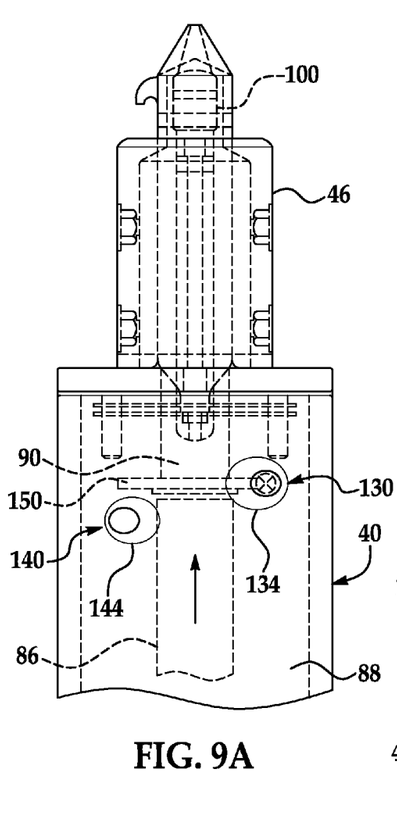
FIG. 9a is a partial schematic side view of inventive device shown in FIG. 1 in a first or open position.
Figure 9B:
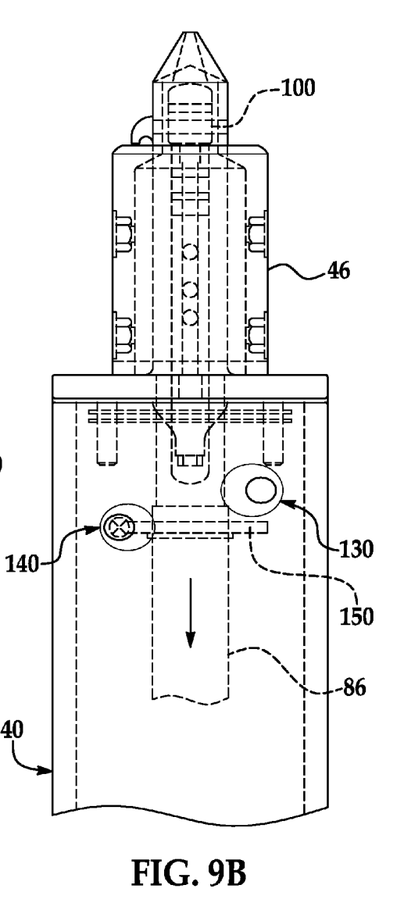
FIG. 9b is an alternate view of FIG. 9a showing the inventive device in a second or closed position.

Referring to FIGS. 4 and 9a and 9b, an example of a target indicator 150 for the inventive device 10 is illustrated. In the example, a rigid and substantially planar disk is connected to the clevis 90 as best seen in FIG. 9a. In a preferred example, indicator disk 150 is manufactured from TEFLON and is readily detectable and/or visually seen by first 110 and second 116 sensors when a portion of the disk 150 is exposed through one of the first 134 or second 144 target apertures. It is understood that other indicators, materials, coatings, configurations and orientations of indicator 150 known by those skilled in the art may be used.

The vertical positions of the indicator disk 150 and the first 134 and 144 target apertures are coordinated, vertically staggered as shown, such that the indicator disk 150 is exposed and detectable by the respective sensor 110 or 116 through only one of the first 134 or second 144 at a time in the manner described below.

In operation, in an vehicle assembly process where a vehicle body 20 is scheduled to be installed on a pallet 24 through placement on pillars 40, a pallet may first be moved into position along a path of travel 54 whereby one or more pillars (four shown in FIG. 1) are placed into alignment with respective sensors 110 and 116 as best seen in FIG. 1. The controller (not shown) actuates each of the sensors to project its respective beam toward the respective first indicator target 130 and second indicator target 140. As best seen in FIG. 9a, the locking system 60 should be in the open position wherein the hook 100 is in a raised position and is substantially concealed inside of locating pin 46. In this position, indicator disk 150 is in a raised position along with hook 100 and is exposed through first target beveled aperture 134 and visible to first sensor 110. The first sensor 110 beam is reflected back to the sensor, or otherwise positive verification of the indicator 150 is read or observed by the sensor. A signal is sent to the processor or other type of device (not shown) verifying that the locking system is in the open position and is ready to accept a vehicle body 20. In the alternative, for example if a vehicle body is already installed, the positive identification provides the system an assurance the locking system 60 is in a position allowing the vehicle body to be removed from the pillars and pallet. It is understood that devices other than, or in addition to, a processor may be used to receive, process or interpret the signals so the positive identification of the securing device 60 position can be made. For example, a computer or other device having hardware, software, memory, preprogrammed instructions and data, controllers, actuators and other devices known by those skilled in the art may be employed in, or used with, system 10.

When a vehicle body is installed on pallet 24 and pillars 40 and it is desired to secure and lock the vehicle body 20 to the pallet, the locking system 60 is actuated in a manner generally described above and illustrated through the mechanism shown in FIGS. 2 and 3. A full explanation of the components and processes can be found in U.S. Patent Application Publication No. 2011/0138601. When the hook 100 is articulated to its second or closed position and engaged with the body, the indicator 150, along with the hook 100, moves to a lower position as best seen in FIG. 9b. In this position, the indicator disk 150 is exposed and visible to second sensor 116 through second target aperture 144 as illustrated. In this position, indicator disk 150 is no longer exposed or visible through the first target aperture 134 by the first sensor 110.

On positive identification by the second sensor 116 that the indicator disk 150 is in the proper position, this provides positive identification and verification that the hook 100 is in the closed and engaged position thereby securing the vehicle body 20 to the pillars 40 and pallet 24.

As noted, the sensors 110 and 116 are preferably in electronic communication (either hard wires or under wireless or cloud-based protocols) with one or more controllers that monitor the positions of the locking mechanisms 60 as read by the sensors. If a sensor reads indicator 150 is not in the proper position when a build process is to occur, software or other instructions may be used to signal a fault, signal an alarm and halt the particular build process until the condition is remedied or a human operator inspects the equipment. Other processes to integrate the above-described sensors in a build process known by those skilled in the art may be used.

It is understood that variations of the above process steps are possible and still within the teaching of the present invention. For example, a vehicle may be installed on the pallet 24 upstream in the build process and arrive at the build station including the sensors or the vehicle body may be installed at the build station including the sensors. Further, the above process and operation steps may also be used downstream in the process. For example, when the build process requires the vehicle body 20 to be removed from the pallet, or simply unlocked for a particular build station, the sensor system 10 can be used to verify the locking system 60 arrives in the station locked and then provide positive verification that the locking mechanism 60 is unlocked so the body can be removed.

It is further understood that although two sensors, 110 and 116, are shown for each pillar 24, one or more than two sensors may be used to suit the particular application. For example, where sufficient for the build process, one sensor may be used with one target and aperture as a "go/no-go" indicator versus two sensors and two targets as described. Additional sensors can be used for increased monitoring as known by those skilled in the art.

It is further understood that indicators other than indicator disk 150 and apertures 134 and 144 may be used with the same or different sensors to accomplish the same objectives as known by those skilled in the art.

Figure 10:
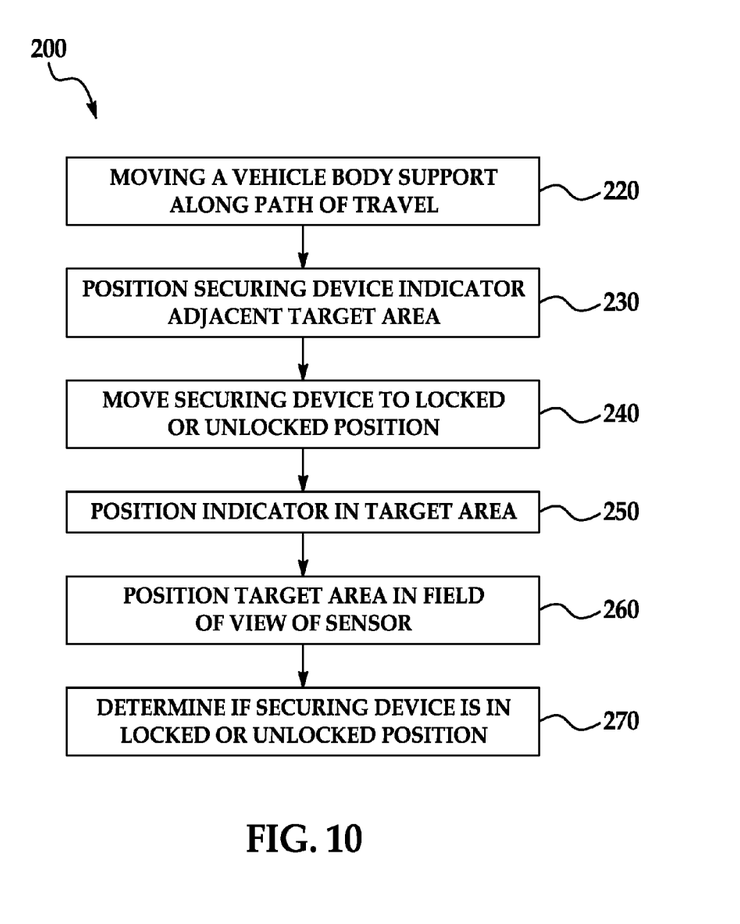
FIG. 10 is a schematic flow chart of an example of process steps for detecting the position of a vehicle body securing device

Referring to FIG. 10, an example of a method 200 for positively detecting the position of a vehicle body securing device is illustrated. In a first exemplary step 220, a vehicle body support is positioned and selectively moved along a path of travel, for example a vehicle body assembly line. In one example, the vehicle body support is a movable pallet 14 with a plurality of pillars or risers 40 as described above and illustrated. Other vehicle body supports and configurations, as well as different process lines and paths of travel, known by those skilled in the art may be used.

In exemplary step 230 a vehicle body securing device or body locking assembly 60 is positioned inside the exemplary pillar or riser 40 as generally described above. In the preferred example, the indicator 150 is connected the securing device 60 generally adjacent or close to the target area (two shown as first 130 and second 140). In one example (not show), only one target area is used and the indicator is moved into and out of the single target area in a simplified go-no-go indicator system. Other schemes and configurations for the target area (s), indicator(s) and relative positions and movements thereof known by those skilled in the art may be used.

In exemplary step 240, the securing device 60 is selectively moved to the open or unlocked position or the closed or locked position depending on the process step the vehicle is in along the assembly line path of travel.

In exemplary step 250, in the example where the indicator 150 is directly connected to the securing device 60, the indicator 150 is positioned in the target area and is exposed, visible or otherwise readable or detectable by the sensor (where only one sensor is used). In the example where two target areas 130 and 140 are used, along with a first 110 and a second 116 sensor, the indicator is moved into one of those target areas for reading or detecting by the respective sensor. In the example, with the indicator 150 in the single or one of the two target areas, the securing device 60 and preferably the hook 100 is either in the open or unlocked or closed or locked position. In a most preferred example, where two target areas 130 and 140 are used with two sensors 110 and 116, the indicator is positioned in the second target area 140 when the hook 100 is in the closed or locked position thereby securing a vehicle body to the riser or pillar 40 (FIG. 4 solid lines). When the indicator 150 is positioned in the first target area 130, the hook 100 is preferably in the open or unlocked position (FIG. 4 dashed lines). It is understood that the positions of the hook 100 and sequence of indicator 150 in the target areas may vary as known by those skilled in the art.

In exemplary steps 260 and 270, when the vehicle body support pallet 114 and risers 40 are moved along the assembly line path of travel and there is a need to check or verify the position of the securing device 60 relative to the risers 40, the pallet 14 is positioned, or alternately the sensors are positioned such that the target area (or areas) are passed through the field of vision of the sensor(s) to read or scan whether the indicator 150 is in the target area or areas to provide a positive indication or feedback as to the position of the securing device 60 in the manner described above.

In a preferred example, the sensor(s) then outputs a signal to a remote device, preferably a processor, to process the sensor signal and determine, preferably through comparison to preprogrammed data, the state or position of the securing device against the correct status for proper assembly at that work station or portion of the assembly line or operation. If for example, the securing device is determined through the sensor system 10 to be in the wrong position for that stage of the assembly line, the system can include preprogrammed instructions or safety precautions to correct the position, for example, halting the assembly line or that pallet 14 from further movement along the assembly line.

It is understood that additional method steps and sequence of steps other than those described above can be used as known by those skilled in the art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sensing device for use in providing positive feedback of a position of a vehicle body securing device used to selectively secure a vehicle body to a vehicle body support moveable along an assembly line path of travel, the sensing device comprising:
   a vehicle body support selectively moveable along an assembly line path of travel;
   a vehicle body securing device connected to the vehicle body support and selectively moveable between a locked position and an unlocked position;
   an indicator connected to the securing device and the vehicle body support, the indicator reciprocally movable to and from a target area when the securing device is in one of the locked position and the unlocked position; and
   a sensor mounted along the path of travel independent of the vehicle body support, the sensor having a field of view selectively alignable with the target area, the sensor operable to detect when the indicator is positioned at the target area to provide a positive indication whether the securing device is in the locked position or the unlocked position.

2. The sensing device of claim 1 wherein:
   the vehicle body support further comprises a hollow support riser connected to and extending upward from a support pallet, the riser having a longitudinal axis and at least partially housing the securing device and vertically supporting a vehicle body; and
   the securing device further comprising a hook moveable with respect to the riser between the locked position and the unlocked position for selectively securing the vehicle body to the riser and the support pallet.

3. The sensing device of claim 2, wherein the riser defines a through aperture positioned along the longitudinal axis, the through aperture defining the target area alignable with the sensor field of view.

4. The sensing device of claim 3, further comprising:
   the securing device further comprising a rod extending though the riser along the longitudinal axis; and the indicator comprising a disk having marking indicia connected to the rod, wherein the disk is positioned at the target area exposing the marking indicia within the sensor field of view when the hook is in one of the locked position or the unlocked position.

5. The sensing device of claim 2 wherein:
the target area comprises a first target area and a second target area positioned distant from the first target area along the riser longitudinal axis; and
the sensor comprises a first sensor and a second sensor, the first sensor having a field of vision in alignment with the first target area and the second sensor having a field of vision in alignment with the second target area, wherein the indicator is positioned in the first target area when the hook is in the locked position and the indicator is positioned in the second target area when the hook is in the unlocked position thereby providing a positive indication whether the securing device is in the locked or the unlocked position.

6. The sensing device of claim 1, further comprising:
a processor in communication with the sensor for receipt of an output signal from the sensor, the processor operable to determine whether the indicator is positioned in the target area thereby providing a positive indication whether the securing device is in the locked position or in the unlocked position.

7. The sensing device of claim 1 wherein the sensor is stationarily mounted at a process station positioned along the path of travel, the sensor operable to detect whether the securing device in the locked or the unlocked position when the vehicle body is positioned at the process station.

8. A method of positively detecting a position of a vehicle body securing device used to selectively secure a vehicle body to a vehicle body support moveable along an assembly line path of travel, the method comprising the steps of:
selectively moving a vehicle body support along a path of travel, the vehicle body support having a vehicle body securing device selectively moveable between a locked position and an unlocked position;
defining a target area on the vehicle body support;
reciprocally moving an indicator to and from the target area, the indicator positioned in the target area when the securing device is in one of the locked position or the unlocked position;
aligning a field of view of a sensor mounted along the path of travel independent of the vehicle body support with the target area; and
detecting with the sensor whether the indicator is positioned at the target area thereby providing a positive indication whether the securing device is in one of the locked or the unlocked position.

9. The method of claim 8 further comprises the step of connecting the indicator to a portion of the securing device wherein the indicator is selectively in communication with the target area.

10. The method of claim 9 wherein the step of defining a target area further comprises the step of exposing a portion of the securing device to the sensor field of vision.

11. The method of claim 10 wherein the step of exposing a portion of the securing device further comprises the step of defining a through aperture in a hollow riser housing the securing device, the aperture positioned along a longitudinal axis of the riser and in the field of view of the sensor.

12. The method of claim 8 wherein the step of detecting further comprises the step of detecting whether the securing device is positively positioned in the locked or the unlocked position.

13. The method of claim 12 further comprising the steps of:
defining a first target area and a second target area positioned vertically distant from the first target area;
aligning a first sensor having a first field of vision including the first target area and aligning a second sensor having a second field of vision including the second target area; and
moving the indicator to one of the first or the second target areas when the securing device is in the locked position and moving the indicator to one of the other of the first or the second target areas when the securing device is in the unlocked position.

14. The method of claim 13 further comprising:
moving the indicator to the first target area when the securing device is positioned in the locked position; and
moving the indicator to the second target area when the securing device is positioned in the unlocked position.

15. The method of claim 8 further comprising the step of applying marking indicia on the indicator, the marking indicia detected by the sensor when the indicator is positioned in the target area.

16. The method of claim 8 further comprising the step of sending an output signal from the sensor to a remote processor dependent on whether the indicator is detected to be positioned in the target area.

17. The method of claim 16 further comprising the step of comparing the detected position of the indicator with preprogrammed data in a processor unit.

18. The method of claim 17 further comprising the step of stopping the movement of the vehicle body support along the path of travel if the detected position of the indicator does not coincide with preprogrammed data in the processor unit.

19. The method of claim 8 wherein the target area is positioned along a longitudinal axis of a hollow support riser mounted to the vehicle body support and the indicator reciprocally moves along the longitudinal axis.

20. A sensing device for use in providing positive feedback of a position of a vehicle body securing device used to selectively secure a vehicle body to a vehicle body support moveable along an assembly line path of travel, the sensing device comprising:
means for selectively moving a vehicle body support along an assembly line path of travel, the vehicle body support having a vehicle body securing device selectively moveable between a locked position and an unlocked position;
means for defining a target area on the vehicle body support;
means for reciprocally moving an indicator to and from the target area, the indicator positioned in the target area when the securing device is in one of the locked position or the unlocked position;
means for aligning a field of view of a stationary sensor positioned along the path of travel independent of the vehicle body support with the target area; and
means for detecting with the sensor whether the indicator is positioned at the target area thereby providing a positive indication whether the securing device is in one of the locked or the unlocked position.

* * * * *